United States Patent Office 3,814,596
Patented June 4, 1974

3,814,596
PROCESS FOR MAKING IRON OR STEEL
Ernest Wallace Voice, East Molesey, and David Alec Hawkes, Guisborough, England, assignors to The British Iron and Steel Research Association, London, England
Filed Dec. 29, 1970, Ser. No. 102,394
Int. Cl. C21b 11/06
U.S. Cl. 75—40                                 2 Claims

ABSTRACT OF THE DISCLOSURE

Apparatus for making iron consists of a generally horizontally disposed rotary furnace lined with refractory materials into the inlet end of which is fed iron ore in particulate form, coal, and fuel oil and oxygen. The furnace is rotated at a sufficient speed to spread the contents of the furnace in a layer around the inner surface of the furnace under centrifugal force with the iron that is formed maintained as an outer layer against the refractory material and with the less heavy layer of slag lying on the layer of iron. By changing the rotational speed of the furnace the slag is mixed with the iron to promote a high rate of reaction. Iron is discharged from the outlet end of the furnace. The method is also applicable to steel making.

---

Figure 1:
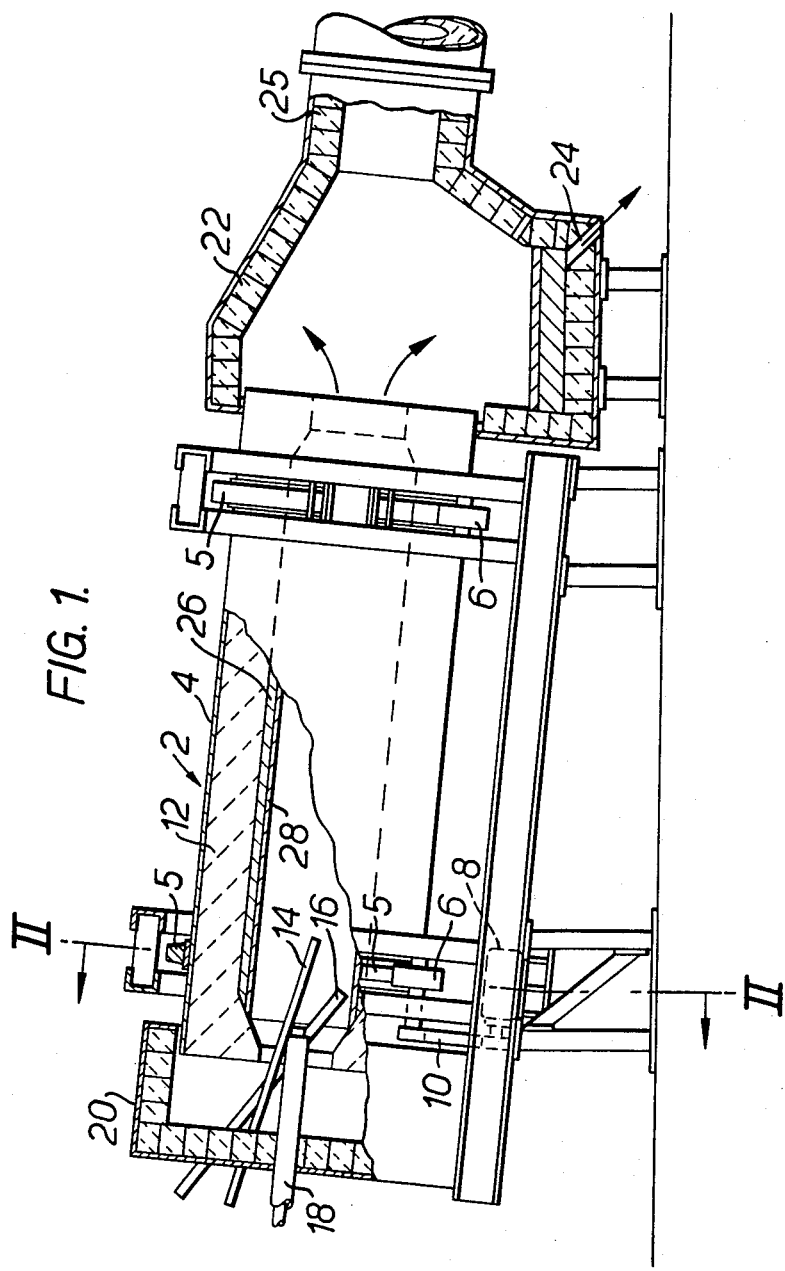

This invention is concerned with a process for making iron or steel.

In "Steel Times," Mar. 17, 1967, pp. 323–4, Eketorp describes (in relation to figure 2 of his paper) a continuous process for sequential iron and steel making. In the first stage of this process particulate iron ore, coke or coal dust and oxygen are supplied to a refractory-lined, generally horizontally-disposed, rotary furnace and in the second stage the liquid metal produced in the first stage is supplied, together with slag-forming particulate material and oxygen to a second, similar, rotary furnace. Both furnaces are rotated about their axis at such a speed that the liquid and solid furnace contents are maintained around the internal wall of the furnace by centrifugal force. The liquid metal, being denser than the slag, forms an outer layer in contact with and covering the refractory lining and the slag forms an inner layer lying on the metal layer. It is well known that the refractories at present available are much more subject to attack by slags at high temperatures than by metals, and a major advantage of the kind of continuous process described by Eketorp is that the metal layer effectively protects the refractory lining from attack by the slag.

We have realized that the formation of definite layers of liquid metal and slag, the latter having floating on it coke or coal in the iron-making stage, and unmelted slag forming additions in the steel-making stage, has the disadvantage that there is inadequate mixing or stirring of the non-metallic compounds, which is essential if the desired high rates of reaction are to be obtained.

We have now discovered that in this type of process the contents of the furnace can be mixed, simply and efficiently, by changing the rate of the rotation of the furnace.

According to the invention, therefore, we provide an iron-making or steel-making process wherein a refractory-lined, generally horizontally-disposed rotary furnace is rotated about its axis at such a speed that the liquid and solid furnace contents are maintained around the internal wall of the furnace by centrifugal force, the said contents comprising liquid metal forming an outer layer in contact with the refractory lining and a non-metallic material forming an inner layer lying on the metal layer, and wherein the non-metallic material is mixed with the liquid metal when the process is operating by changing the rotational speed of the furnace.

The rotary furnace is generally horizontally-disposed, that is at an angle no greater than 8° to the horizontal and preferably about 3°. Preferably, the rotational speed of the furnace is changed by acceleration. It is to be understood that it is the acceleration, and not the resulting increased speed, whtich causes mixing. After acceleration, the higher speed may be maintained until further mixing is necessary, when after first deceleratnig if necessary, the furnace will again be accelerated.

It has been discovered that the rate of acceleration controls the degree of mixing, and hence the acceleration used will be high enough to promote sufficient mixing for the desired rate of reduction to be obtained, but not high enough to cause the non-metallic material i.e. slag to break through the liquid metal layer and contact the surface of the refractory. It appears that deceleration may to some extent nullify the mixing effect of acceleration and, therefore, it appears that deceleration immediately prior to acceleration is preferable. The exact sequence of operation is an important process variable, but a suitable method is to control the furnace speed between upper and lower limits with preset deceleration and acceleration occurring at perset time intervals.

In order to retain the liquid furnace contents on the interior wall of the furnace, we have found that it is normally necessary to operate the process so that there is a centrifugal acceleration of 3.5 to 12$g$, preferably 6 to 12$g$, at the inside surface of the furnace.

Although a method of iron-making with a rotary furnace is described below with reference to the drawings the invention can be applied to steel-making in a rotary furnace.

Figure 2:
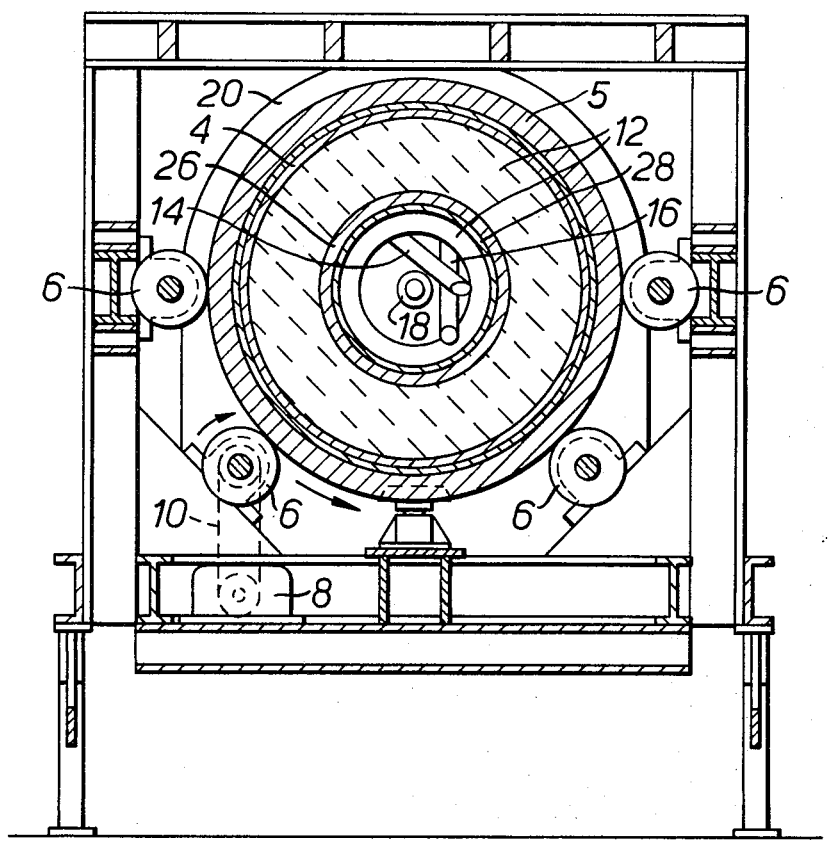

In the accompanying drawings:

FIG. 1 is a side view, partly cut away, of one embodiment of apparatus for making iron in accordance with the invention and, FIG. 2 is a cross section along the lines II—II of FIG. 1.

A rotary furnace 2 consisting of a drum 4 of generally cylindrical form is mounted for rotation about its axis. The axis is generally horizontally disposed, being inclined at only 3°. Two annular rails 5 surround the drum 4 adjacent to each end of the drum 4 and are engaged by rollers 6 which thus support the furnace 2. One of the rollers 6 is driven by a motor 8 via a belt 10.

The drum 4 is lined with a layer of a refractory material 12. The furnace 2 is open at each end, and the upper or inlet end has projecting into it a pipe 14 for feeding ore, a pipe 16 for feeding coal, and a fuel oil oxygen burner 18. A refractory lined hood 20 surrounds the inlet end of the furnace.

The outlet end of the furnace is surrounded by a refractory lined hood 22, the bottom of which is provided with a tapping hole 24. The hood 24 has an outlet 25 for waste gases. The refractory lining 12 in the furnace is thicker at each end than in the middle so as to constrict the diameter of the entry and exit of the furnace.

In use the furnace 2 is rotated by means of the motor 8. Ore in particulate form is fed through pipe 14, coal is fed through pipe 16, and fuel and oxygen introduced through the burner 18. Carbon reduces the ore to iron and carbon monoxide, and oxygen oxidizes the resultant carbon monoxide to carbon dioxide, thus releasing heat required to maintain the process. The furnace 2 is rotated at a sufficient speed to spread the contents of the furnace in a layer around the inner surface. Under the centrifugal force the various liquid and solid constituents segregate into separate layers, and the heaviest constituent, iron, is maintained as the outer layer against the refractory surface.

The layer of iron 26 and the non-metallic layer 28 are shonw in FIGS. 1 and 2.

The process can be run as a continuous process and as materials are continuously fed into the inlet end liquid iron pours into the collecting hood 22 at the outlet end and is collected through the tapping hole 24.

In accordance with the invention, in order to speed up the reactions in the furnace the drum is not rotated at a uniform speed but is periodically accelerated and then decelerated by varying the motor 8. This has the effect of mixing the metallic layer 26 with the non metallic layer 28. The speed is controlled between an upper and a lower limit and preset deleceration and re-acceleration is effected at present intervals.

We claim:

1. In an iron-making or steel-making process wherein a refractory-lined, generally horizontally disposed, rotary furnace having an inlet end and an outlet end is charged at its inlet end with iron or steel making materials including non-metallic material while heating the materials sufficiently to produce molten metal and at the same time spreading the molten metal as a layer in contact with the refractory lining and spreading the non-metallic material as an inner layer on the molten metal layer under a centrifugal force of at least $3.5g$ at the inside surface of the surface of the furnace by rotating the furnace at sufficient speed about its axis, the molten metal layer protecting the furnace lining from attack by the slag; the improvement in combination therewith comprising the steps of mixing the molten metal and the non-metallic material in the rotating furnace after establishing the layers of materials and thereby promoting a high rate of reaction therebetween to make iron or steel, while maintaining the furnace contents around the internal wall, by alternately accelerating and decelerating the rotational speed of the furnace and controlling the rate of said acceleration and deceleration of rotation of the furnace in such a manner as to prevent the non-metallic material from breaking through the liquid metal layer and contacting the refractory lining of the furnace while the non-metallic material is being mixed with the molten metal.

2. The process of claim 1 wherein the furnace speed is controlled between an upper and a lower limit and preset deceleration and re-acceleration is effected at preset time intervals.

References Cited

UNITED STATES PATENTS

| | | | |
|---|---|---|---|
| 2,866,703 | 12/1958 | Goss | 75—61 |
| 3,393,997 | 7/1968 | Faste | 266—36 H |
| 2,598,393 | 5/1952 | Kalling et al. | 266—36 H |
| 3,653,879 | 4/1972 | Wienert | 75—93 R |

L. DEWAYNE RUTLEDGE, Primary Examiner

M. J. ANDREWS, Assistant Examiner

U.S. Cl. X.R.

75—50, 61, 93